(12) United States Patent
Su et al.

(10) Patent No.: US 12,145,446 B2
(45) Date of Patent: Nov. 19, 2024

(54) DUAL-MOTOR MULTI-GEAR HYBRID TRANSMISSION SYSTEM AND VEHICLE

(71) Applicants: YIWU GEELY AUTOMATIC TRANSMISSION CO., LTD., Yiwu (CN); NINGBO GEELY ROYAL ENGINE COMPONENTS CO., LTD., Ningbo (CN); AUROBAY TECHNOLOGY CO., LTD., Ningbo (CN); ZHEJIANG GEELY HOLDING GROUP CO., LTD., Hangzhou (CN)

(72) Inventors: Yu Su, Yiwu (CN); Erpeng Wang, Yiwu (CN); Xiaozhe Lin, Yiwu (CN); Haisheng Yu, Yiwu (CN); Yan Sun, Yiwu (CN); Jun Fu, Yiwu (CN); Yanjun Tan, Yiwu (CN); Xu Zhang, Yiwu (CN); Kaiwen Wang, Yiwu (CN); Heng Zhang, Yiwu (CN); Jianbin Sun, Yiwu (CN); Xin Zhao, Yiwu (CN); Ruiping Wang, Yiwu (CN); Ingo Scholten, Yiwu (CN)

(73) Assignees: YIWU GEELY AUTOMATIC TRANSMISSION CO., LTD., Yiwu (CN); NINGBO GEELY ROYAL ENGINE COMPONENTS CO., LTD., Ningbo (CN); AUROBAY TECHNOLOGY CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 18/536,665

(22) Filed: Dec. 12, 2023

(65) Prior Publication Data
US 2024/0100932 A1 Mar. 28, 2024

Related U.S. Application Data

(63) Continuation of application No. PCT/CN2021/132140, filed on Nov. 22, 2021.

(30) Foreign Application Priority Data

Aug. 5, 2021 (CN) .......................... 202110905044.9

(51) Int. Cl.
*B60K 1/02* (2006.01)
*B60K 6/365* (2007.10)
(Continued)

(52) U.S. Cl.
CPC ................ *B60K 6/387* (2013.01); *B60K 1/02* (2013.01); *B60K 6/365* (2013.01); *B60K 6/547* (2013.01)

(58) Field of Classification Search
CPC .......... B60K 1/02; B60K 6/365; B60K 6/547; B60K 6/44; B60W 10/113; F16H 61/688
See application file for complete search history.

(56) References Cited

U.S. PATENT DOCUMENTS 5,558,588 A 9/1996 Schmidt
2021/0199179 A1 7/2021 Xie et al.

FOREIGN PATENT DOCUMENTS

CN 205365218 U * 7/2016
CN 108349367 A 7/2018
(Continued)

OTHER PUBLICATIONS

CN 205365218 U; 2016.*
(Continued)

*Primary Examiner* — Derek D Knight
(74) *Attorney, Agent, or Firm* — Westbridge IP LLC

(57) ABSTRACT

Disclosed are a dual-motor multi-gear hybrid transmission system and a vehicle. The dual-motor multi-gear hybrid
(Continued)

transmission system includes an engine, a first motor, a second motor, a first clutch, a second clutch, a first planet row, a second planet row, a first input shaft, a second input shaft, a third input shaft and a brake assembly. The first input shaft is connected to the engine through the first clutch. The second input shaft is connected to the engine through the second clutch, and the second input shaft is sleeved outside the first input shaft. The first motor is connected to the engine. The second motor is connected to the first planet row through the third input shaft. The brake assembly is configured to brake the first planet row and/or the second planet row.

7 Claims, 11 Drawing Sheets

(51) Int. Cl.
  *B60K 6/387* (2007.10)
  *B60K 6/547* (2007.10)

(56) References Cited

FOREIGN PATENT DOCUMENTS

| | | |
|---|---|---|
| CN | 109177716 A | 1/2019 |
| CN | 110525194 A | 12/2019 |
| CN | 111114278 A | 5/2020 |
| CN | 111279098 A | 6/2020 |
| CN | 112780734 A | 5/2021 |
| CN | 113400923 A | 9/2021 |
| WO | 2019075497 A1 | 4/2019 |
| WO | 2020048105 A1 | 3/2020 |

OTHER PUBLICATIONS

First Office Action issued in counterpart Chinese Patent Application No. 202110905044.9, dated Jan. 28, 2022.
International Search Report and Written Opinion issued in corresponding PCT Application No. PCT/CN2021/132140, dated May 10, 2022.
Notification to Grant Patent Right for Invention issued in counterpart Chinese Patent Application No. 202110905044.9, dated May 17, 2022.

* cited by examiner

DUAL-MOTOR MULTI-GEAR HYBRID TRANSMISSION SYSTEM AND VEHICLE

CROSS-REFERENCE TO RELATED APPLICATIONS

This application is a continuation application of International Application No. PCT/CN2021/132140, filed on Nov. 22, 2021, which claims priority to Chinese Patent Application No. 202110905044.9, filed on Aug. 5, 2021. The disclosures of the above-mentioned applications are incorporated herein by reference in their entireties.

TECHNICAL FIELD

The present application relates to the technical field of vehicles, and in particular, to a dual-motor multi-gear hybrid transmission system and a vehicle.

BACKGROUND

Since traditional fuel vehicles consume non-renewable resources and cause serious pollution, and current pure electric vehicles hit a bottleneck in battery technology, hybrid vehicles have gradually become the mainstream of vehicle development due to their high practicability and advantages in environmental protection. Hybrid means that the vehicle uses gasoline drive and electric drive. The key is the hybrid system whose performance is directly related to the performance of the hybrid vehicle.

At present, the commonly used hybrid system often adopts a fixed speed ratio, but the fixed speed ratio prevents the engine from working at the best economic point, and the power transmission performance is greatly limited.

SUMMARY

The main purpose of the present application is to provides a dual-motor multi-gear hybrid transmission system, which aims to solve the fixed speed ratio problem of hybrid power systems and improve power transmission performance.

In order to achieve the above purpose, the dual-motor multi-gear hybrid transmission system according to the present application includes an engine, a first motor, a second motor, a first clutch, a second clutch, a first planet row, a second planet row, a first input shaft, a second input shaft, a third input shaft and a brake assembly,
  the first input shaft is connected to the engine through the first clutch;
  the second input shaft is connected to the engine through the second clutch, and the second input shaft is sleeved outside the first input shaft;
  the first motor is connected to the engine;
  the second motor is connected to the first planet row through the third input shaft; and
  the brake assembly is configured to brake the first planet row and/or the second planet row.

In some embodiments, the first planet row includes a first sun gear, a first planet carrier, a first planet gear and a first gear ring;
  the second planet row includes a second sun gear, a second planet carrier, a second planet gear and a second gear ring; and
  the first planet carrier is connected to the second gear ring, and the second planet carrier is connected to the first gear ring.

In some embodiments, the brake assembly includes a first brake connected to the second planet carrier.

In some embodiments, the brake assembly includes a second brake connected to the second sun gear.

In some embodiments, the dual-motor multi-gear hybrid transmission system further includes a first intermediate shaft sleeved outside the first input shaft,
  the second brake is connected to the second sun gear through the first intermediate shaft.

In some embodiments, the dual-motor multi-gear hybrid transmission system further includes a second intermediate shaft connected to the second gear ring and configured to output power.

In some embodiments, the dual-motor multi-gear hybrid transmission system further includes a differential connected to the second intermediate shaft.

In some embodiments, the dual-motor multi-gear hybrid transmission system further includes a torsional damper provided between the engine and the first motor.

In some embodiments, both the first motor and the second motor are connected to a power battery, and
  the dual-motor multi-gear hybrid transmission system has one or more of the following modes:
  a pure electric mode, the second motor as a driving motor works by using electric energy of the power battery, the engine does not work, and the first motor does not work;
  a series mode, the second motor as the driving motor works by using the electric energy of the power battery, the first motor as a generator is driven by the engine to supply power to the second motor or to charge the power battery under a preset working condition;
  a parallel mode, the engine operates at a preset economical operating point, the second motor performs power output according to a current dynamic demand or charges the power battery according to an electric power demand of the power battery, and the first motor does not work; and
  a power-split mode, the second motor as the driving motor works by using the electric energy of the power battery, the engine works, and the first motor as a generator is driven by the engine to generate electricity for the use of the second motor, or
  the second motor as the driving motor works by using the electric energy of the power battery, the engine works, and the first motor as the driving motor works by using the electric energy of the power battery.

The present application further provides a vehicle including the above mentioned dual-motor multi-gear hybrid transmission system.

In the technical solution of the present application, a double clutch is adopted to connect two input shafts sleeved together. The first clutch is connected to the engine through the first input shaft, and the second clutch is connected to the engine through the second input shaft, thereby realizing the transmission of power on two input shafts. Afterwards the power is transmitted to the first planet row and/or the second planet row. The connection between the second motor and the first planet row realizes the transmission of the power from the second motor to the first planet row. Further, the brake assembly is used to control the transmission of power in the first planet row and/or the second planet row, and the engine is connected to the first motor to transmit power from the engine to the first motor, thereby realizing various driving modes such as the pure electric mode, the series mode, the parallel mode and the power-split mode. Compared with the existing hybrid power transmission system, the problem of fixed speed ratio is solved. The speed ratio of the dual-motor multi-gear hybrid transmission system can be flexibly adjusted according to different driving modes, which meets the optimization of economy without reducing performance, allowing the engine to work at the optimal operating point. On the one hand, the power transmission performance is improved. On the other hand, the engine is made to work more economically and the transmission efficiency is improved. In addition, both the first motor and the second motor have driving capabilities. On the one hand, the performance of the first motor is improved and costs is reduced while the performance of the second motor is reduced. On the other hand, in the dual-motor drive mode, the engine can flexibly enter the series mode to provide energy for the dual motors and make the driving power of the vehicle stronger.

BRIEF DESCRIPTION OF THE DRAWINGS

In order to more clearly illustrate the technical solutions in the embodiments of the present application or in the related art, a brief introduction will be given to the accompanying drawings required in the description of the embodiments or the related art. Obviously, the accompanying drawings in the following description are only some embodiments of the present application. For those skilled in the art, other accompanying drawings can be obtained based on the structures shown in these drawings without any creative effort.

Figure 1:
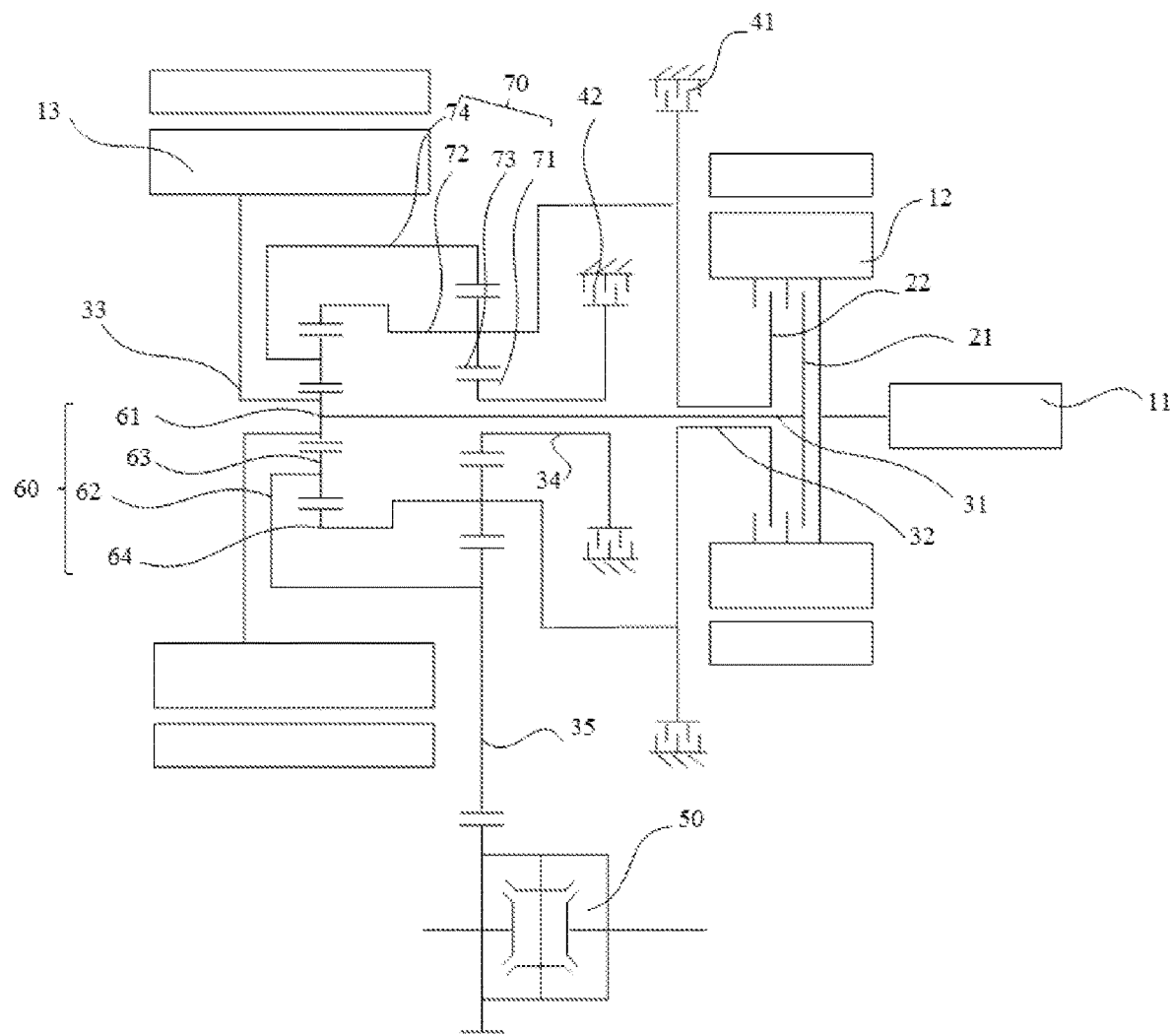
FIG. 1 is a schematic structural view of a dual-motor multi-gear hybrid transmission system according to some embodiments of the present application.

The realization of the purpose, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings in the embodiments of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indications (such as up, down, left, right, front, rear, etc.) in the embodiments of the present application are only used to explain the relative positional relationship, movement situation, etc. among components in a specific attitude (as shown in the drawings). If the specific attitude changes, the directional indication also changes accordingly.

In addition, the descriptions related to "first", "second" and the like in the present application are merely for descriptive purposes, and should not be understood as indicating or implying their relative importance or implicitly indicating the number of technical features indicated. Therefore, the features defined by "first" and "second" may explicitly or implicitly include at least one such feature. In addition, "and/or" in the whole text includes three solutions, taking A and/or B as an example, including A technical solution, or B technical solution, or a technical solution that both A and B meet. Besides, the technical solutions among various embodiments can be combined with each other, but the combination must be based on what can be achieved by those skilled in the art. When the combination of technical solutions is contradictory or cannot be achieved, it should be considered that such combination does not exist, and is not within the scope of the present application.

In recent years, hybrid vehicles have gradually become the mainstream in vehicle field due to their high practicability, advantages in environmental protection and other advantages. At present, the commonly used hybrid system often adopts a fixed speed ratio, but the fixed speed ratio prevents the engine from working at the best economic point, and the power transmission performance is greatly limited. In view of this, the present application proposes a dual-motor multi-gear hybrid transmission system.

As shown in FIG. 1, in some embodiments of the present application, the dual-motor multi-gear hybrid transmission system includes an engine 11, a first motor 12, a second motor 13, a first clutch 21, a second clutch 22, a first planet row 60, a second planet row 70, a first input shaft 31, a second input shaft 32, a third input shaft 33 and a brake assembly.

The first input shaft 31 is connected to the engine 11 through the first clutch 21, the second input shaft 32 is connected to the engine 11 through the second clutch 22, and the second input shaft 32 is sleeved outside the first input shaft 31. Specifically, the first input shaft 31 is fixedly connected to a driven plate of the first clutch 21, and a driving plate of the first clutch 21 is connected to a flywheel of the engine 11. The engagement of the first clutch 21 and the engine 11 can realize the power transmission from the engine 11 to the first input shaft 31, and the disengagement of the first clutch 21 from the engine 11 can interrupt the power transmission from the engine 11 to the first input shaft 31. The second input shaft 32 is fixedly connected to the driven plate of the second clutch 22, and the driving plate of the second clutch 22 is connected to the flywheel of the engine 11. The engagement of the second clutch 22 and the engine 11 can realize the power transmission from the engine 11 to the second input shaft 32, and the disengagement of the second clutch 22 from the engine 11 can interrupt the power transmission from the engine 11 to the second input shaft 32. The first input shaft 31 and the second input shaft 32 are arranged coaxially. The first input shaft 31 is a solid shaft, the second input shaft 32 is a hollow shaft, and the second input shaft 32 is sleeved outside the first input shaft 31. The two shafts can rotate relative to each other. The first clutch 21 and the second clutch 22 are dual clutch transmissions (DCT), specifically dry DCT or wet DCT. Certainly, the first clutch 21 and the second clutch 22 can also be two single clutches, specifically dog tooth clutches or dry clutches.

The first motor 12 is connected to the engine 11. Specifically, a rotor shaft of the first motor 12 is spline-connected to an output shaft of the flywheel of the engine 11, and is configured to transmit power from the engine 11 to the first motor 12. The first motor 12 can be used as a generator to generate electricity under the drive of the engine 11, and can also achieve the driving function for driving the motor.

The second motor 13 is connected to the first planet row 60 through the third input shaft 33. Specifically, the second motor 13 can be used as a driving motor to realize the driving function, thereby transmitting the driving power of the second motor 13 to the first planet row 60 through the third input shaft 33.

In some embodiments, a speed ratio gear can also be provided between the first motor 12 and the engine 11 to generate a speed ratio and provide more gears for the dual-motor multi-gear hybrid transmission system, such that there are more options when selecting and matching the engine 11 and the first motor 12.

Both the first motor 12 and the second motor 13 have driving capabilities. On the premise of reducing the performance of the second motor 13, the performance of the first motor 12 is improved, thus reducing the overall cost of driving. The dual-motor driving mode allows the engine 11 to flexibly enter the driving work and provide energy for the dual motors.

The brake assembly is configured to brake the first planet row 60 and/or the second planet row 70. Specifically, the brake assembly is connected with the first planet row 60 and/or the second planet row 70. When the brake assembly is connected with the first planet row 60 and/or the second planet row 70, power can be transmitted within the first planet row 60 and/or the second planet row 70; when the brake assembly is disengaged with the first planet row 60 and/or the second planet row 70, the transmission of power within the first planet row 60 and/or the second planet row 70 can be interrupted.

In some embodiments of the present application, a dual clutch is adopted to connect two input shafts sleeved together. The first clutch 21 is connected to the engine 11 through the first input shaft 31, and the second clutch 22 is connected to the engine 11 through the second input shaft 32. Therefore, power from the engine 11 can be transmitted to the two input shafts, and then to the first planet row 60 and/or the second planet row 70. The connection between the second motor 13 and the first planet row 60 realizes the transmission of the power from the second motor 13 to the first planet row 60. The transmission of power in the first planet row 60 is controlled through the brake assembly, and the engine 11 is connected to the first motor 12 to transmit the power from the engine 11 to the first motor 12, thereby realizing various driving modes such as the pure electric mode, the series mode, the parallel mode and the power split mode. Compared with the existing hybrid transmission system, the problem of fixed speed ratio is solved. The speed ratio of the dual-motor multi-gear hybrid transmission system can be flexibly adjusted according to different driving modes, which meets the optimization of economy without reducing performance, allowing the engine 11 to work at the optimal operating point. On the one hand, the power transmission performance is improved; on the other hand, the engine 11 is made to work more economically and the transmission efficiency is improved. In addition, both the first motor 12 and the second motor 13 have driving capabilities. On the one hand, the performance of the first motor 12 is improved and the cost is reduced while the performance of the second motor 13 is reduced. On the other hand, in the dual-motor driving mode, the engine 11 can be flexibly enter into the series mode to provide energy for the dual motors, making the driving power of the vehicle stronger.

As shown in FIG. 1, the first planet row 60 includes a first sun gear 61, a first planet carrier 62, a first planet gear 63 and a first gear ring 64, and the second planet row 70 includes a second sun gear 71, a second planet carrier 72, a second planet gear 73 and a second gear ring 74.

Specifically, the first sun gear 61 is connected to the second motor 13 through the third input shaft 33, the first planet carrier 62 is connected to the second gear ring 74, the first planet gear 63 is fixed to the first planet carrier 62, and the first gear ring 64 is connected to the second planet carrier 72. The connection between the first planet row 60 and the second planet row 70 realizes the transmission of power between the first planet row 60 and the second planet row 70. Both the second sun gear 71 and the second planet carrier 72 are connected with the brake assembly, and the connection between the second planet row 70 and the brake assembly realizes the control of the power transmission of the second planet row 70 through the brake assembly, and further realizes the control of the power transmission of the first planet row 60 through the brake assembly. The brake assembly can control the power transmission in the first planet row 60 and/or the second planet row 70, thereby realizing a multi-gear driving mode, which may adapt to more actual working conditions, and make the dual-motor multi-gear hybrid transmission system have a wider scope of application.

As shown in FIG. 1, the brake assembly includes a first brake 41, and the first brake 41 is connected to the second planet carrier 72. Specifically, the first brake 41 is spline-connected to the second input shaft 32 through its friction plate, a steel sheet of the first brake 41 is connected to a transmission case through a spline, and a rotating part of the first brake 41 is connected to the second planet carrier 72. In this way, by controlling the engagement or disengagement of the first brake 41 and the second planet carrier 72, control of the power transmission or interruption within the first planet row 60 is achieved.

The brake assembly also includes a second brake 42, and the second brake 42 is connected with the second sun gear 71. Specifically, the steel sheet of the second brake 42 is connected to the transmission case by the spline. The dual-motor multi-gear hybrid transmission system also includes a first intermediate shaft 34, and the first intermediate shaft 34 is sleeved outside the first input shaft 31. In addition, the second brake 42 is connected to the second sun gear 71 through the first intermediate shaft 34. In this way, by controlling the engagement or disengagement of the second brake 42 and the second sun gear 71, control of the power transmission or interruption within the second planet row 70 is realized.

As shown in FIG. 1, the dual-motor multi-gear hybrid transmission system also includes a second intermediate shaft 35. The second intermediate shaft 35 is connected to the second gear ring 74, and is configured to output power. The dual-motor multi-gear hybrid transmission system also includes a differential 50, which is connected to the second intermediate shaft 35. In this way, after the power of the engine 11 and/or the first motor 12 and/or the second motor 13 is transmitted through the input shaft and the planet row, it is transmitted to the second intermediate shaft 35 through the second gear ring 74 and then to the differential 50, afterwards transmitted to the half shaft through the differential 50, and finally output to the wheels to realize the driving of the vehicle.

Furthermore, in order to reduce the natural frequency of torsional vibration of the transmission system, the dual-motor multi-gear hybrid transmission system also includes a torsional damper (not shown) provided between the engine 11 and the first motor 12. The torsional damper can reduce the torsional stiffness of a joint part between a crankshaft and the transmission system of the engine 11, thereby reducing the natural frequency of torsional vibration of the transmission system, increasing the torsional damping of the transmission system, suppressing an amplitude corresponding to the torsional resonance, and attenuating the transient torsional vibration caused by impact. By controlling the torsional vibration of the clutch and a shaft system of the transmission when the power transmission assembly is idling, and eliminating the idling noise of the transmission, as well as the torsional vibration and noise of the main reducer and transmission, it can also alleviate the torsional impact load of the transmission system under unstable operating conditions and improve the smoothness of the clutch engagement.

As shown in FIG. 1, both the first motor 12 and the second motor 13 are connected to a power battery (not shown), and the dual-motor multi-gear hybrid transmission system has one or more of the following working modes:

a pure electric mode: the second motor 13 as a driving motor works by using electric energy of the power battery, the engine 11 does not work, and the first motor 12 does not work;

a series mode: the second motor 13 as the driving motor works by using the electric energy of the power battery, the first motor 12 as a generator is driven by the engine 11 to supply power to the second motor 13 or to charge the power battery under a preset working condition. The preset working condition may be a situation where the power battery is insufficient;

a parallel mode: the engine 11 operates at a preset economical operating point, the second motor 13 performs power output according to a current dynamic demand or charges the power battery according to an electric power demand of the power battery, and the first motor 12 does not work. The engine 11 operates at the preset economical operating point, which means the engine 11 is driven at the operating point with low fuel consumption, and the fuel consumption can be determined according to a fuel consumption map of the engine; and a power-split mode: the second motor 13 as the driving motor works by using the electric energy of the power battery, the engine 11 works, meanwhile, the first motor 12 as the driving motor is driven by the engine 11 to generate electricity for the use of the second motor 13, or the second motor 13 as the driving motor works by using the electric energy of the power battery, the engine 11 works, meanwhile, the first motor 12 as the driving motor works by using the electric energy of the power battery.

In some embodiments, the dual-motor multi-gear hybrid transmission system can realize multi-gear operation in pure electric mode, series mode, parallel mode and power-split mode. In some embodiments, there are nine gears: first gear of pure electric mode, second gear of pure electric mode, first gear of series mode, second gear of series mode, first gear of parallel mode, second gear of parallel mode, third gear of parallel mode, fourth gear of parallel mode, and power-split mode, all of which are explained as an example.

The working status of some embodiments is shown in Table 1:

TABLE 1

Working status table of some embodiments of the dual-motor multi-gear hybrid transmission system

| gears | engine 11 | first motor 12 | second motor 13 | first clutch 21 | second clutch 22 | first brake 41 | second brake 42 |
|---|---|---|---|---|---|---|---|
| first gear of pure electric mode | | | √ | | | √ | |
| second gear of pure electric mode | | | √ | | | | √ |
| first gear of series mode | √ | √ | √ | | | √ | |
| second gear of series mode | √ | √ | √ | | | | √ |
| first gear of parallel mode | √ | | √ | √ | | √ | |
| second gear of parallel mode | √ | | √ | √ | | | √ |
| third gear of parallel mode | √ | | √ | √ | √ | | |
| fourth gear of parallel mode | √ | √ | √ | | √ | | √ |
| power-split mode | √ | √ | √ | | √ | | |

FIG. 3 to FIG. 10 are power path diagrams of the dual-motor multi-gear hybrid transmission system at first gear of pure electric mode, second gear of pure electric mode, first gear of series mode, second gear of series mode, first gear of parallel mode, second gear of parallel mode, third gear of parallel mode, fourth gear of parallel mode, and power-split mode. The power path of the gear hybrid transmission system is indicated by a bold line in each diagram.

Figure 3:
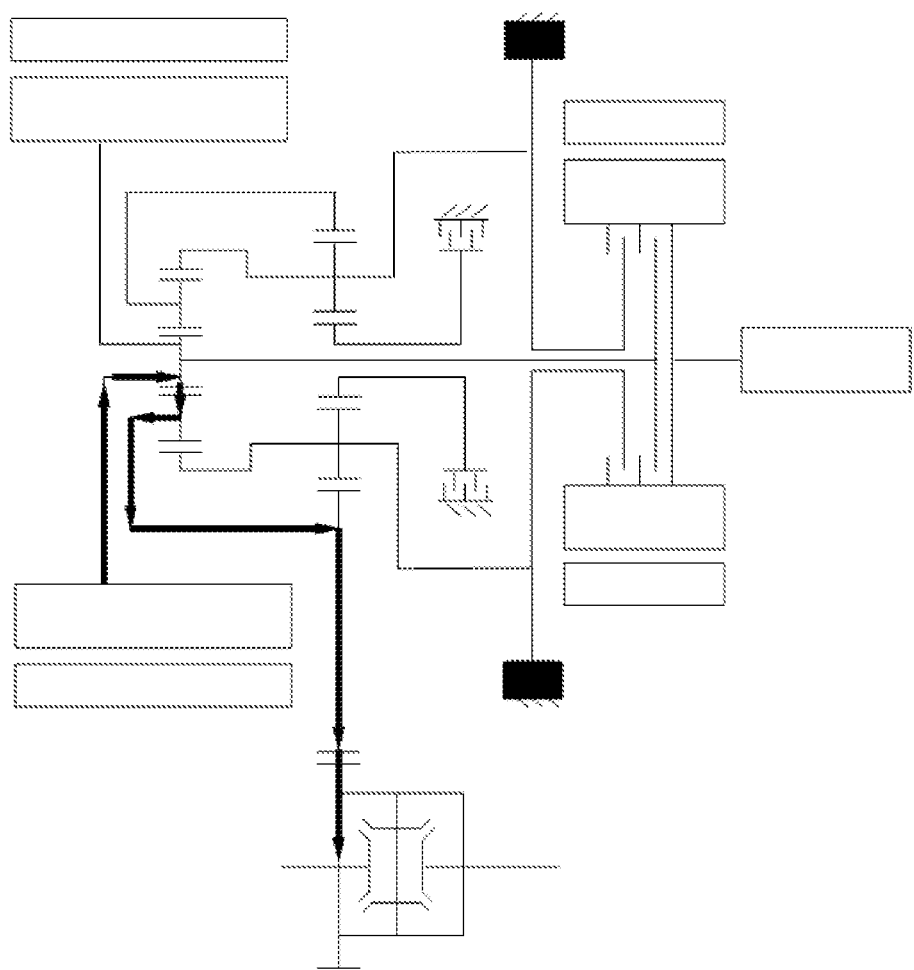
FIG. 3 is a power path diagram of the dual-motor multi-gear hybrid transmission system of FIG. 1 at a first gear of a pure electric mode.

As shown in FIG. 3, in this embodiment, at the first gear of pure electric mode, the first brake 41 is engaged, and the second planet carrier 72 is fixed. The second motor 13 drives the first sun gear 61 to transmit power to the second gear ring 74 through the first planet gear 63 and the first planet carrier 62. The second gear ring 74 transmits the power to the second intermediate shaft 35 and then to the differential 50.

Figure 4:
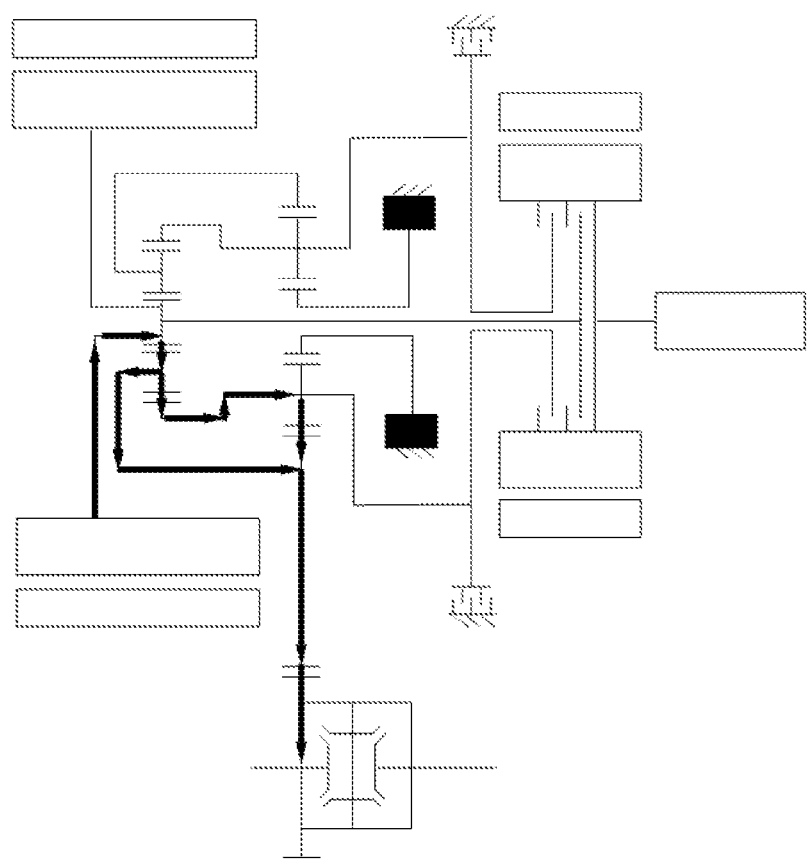
FIG. 4 is a power path diagram of the dual-motor multi-gear hybrid transmission system of FIG. 1 at a second gear of the pure electric mode.

As shown in FIG. 4, in this embodiment, at the second gear of pure electric mode, the second brake 42 is engaged, and the second sun gear 71 is fixed. The second motor 13 drives the first sun gear 61 to transmit a part of the power to the second gear ring 74 through the first planet gear 63 and the first planet carrier 62; the other part of the power is transmitted from the first planet carrier 62 to the first gear ring 64, and then from the first gear ring 64 to the second planet carrier 72 and the second gear ring 74. The second gear ring 74 then transmits the power to the second intermediate shaft 35 and then to the differential 50.

Figure 5:
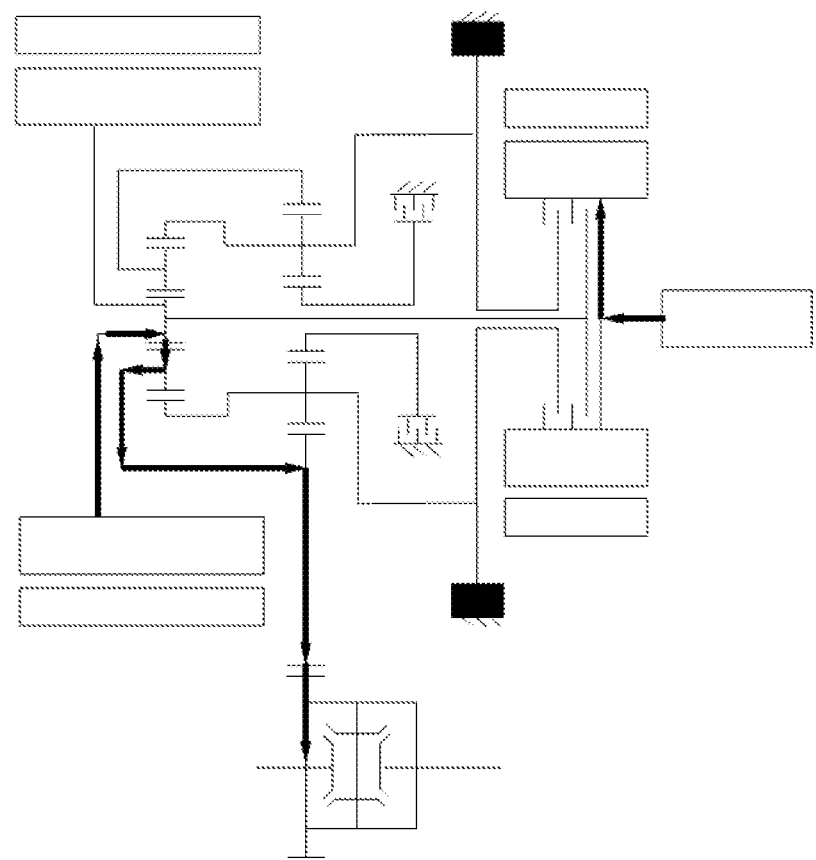
FIG. 5 is a power path diagram of the dual-motor multi-gear hybrid transmission system of FIG. 1 at a first gear of a series mode.

As shown in FIG. 5, in this embodiment, at the first gear of series mode, the first brake 41 is engaged, and the second planet carrier 72 is fixed. The second motor 13 drives the first sun gear 61 to transmit the power to the second gear ring 74 through the first planet gear 63 and the first planet carrier 62. The second gear ring 74 transmits the power to the second intermediate shaft 35, and then to the differential 50. The engine 11 works to drive the first motor 12 as a generator to generate electricity, to charge the traction battery.

Figure 6:
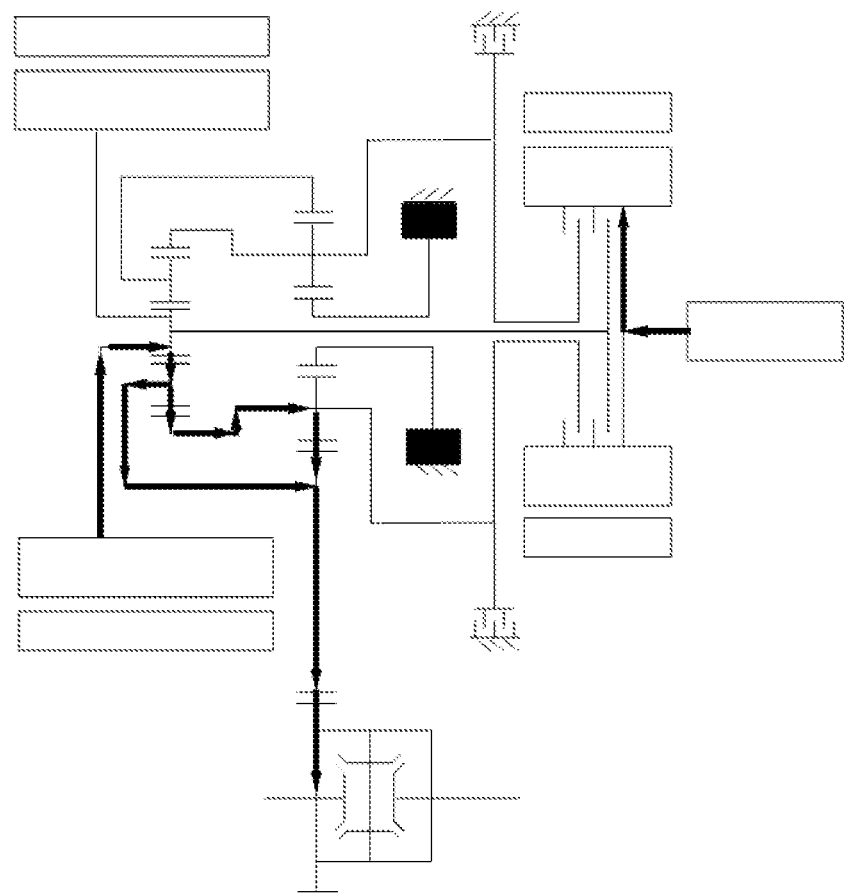
FIG. 6 is a power path diagram of the dual-motor multi-gear hybrid transmission system of FIG. 1 at a second gear of the series mode.

As shown in FIG. 6, in this embodiment, at the second gear of series mode, the second brake 42 is engaged, and the second sun gear 71 is fixed. The second motor 13 drives the first sun gear 61 to transmit a part of the power to the second gear ring 74 through the first planet gear 63 and the first planet carrier 62; the other part of the power is transmitted from the first planet carrier 62 to the first gear ring 64, and then from the first gear ring 64 to the second planet carrier 72 and the second gear ring 74. The second gear ring 74 transmits the power to the second intermediate shaft 35, and then to the differential 50. The engine 11 works to drive the first motor 12 as a generator to generate electricity, and charge the power storage battery.

Figure 7:
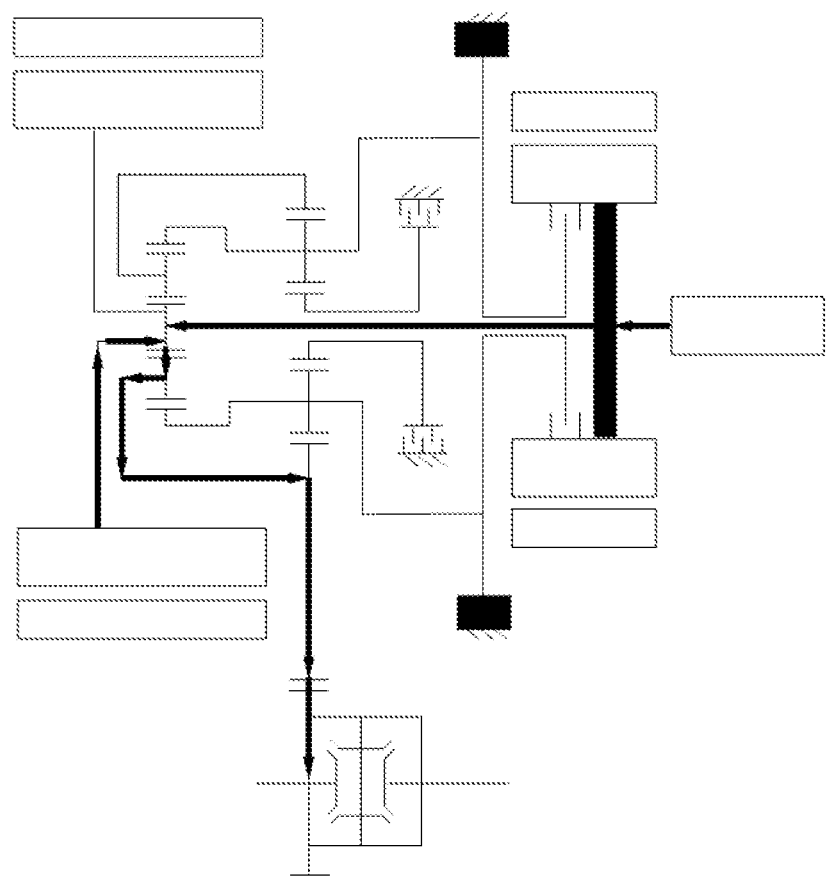
FIG. 7 is a power path diagram of the dual-motor multi-gear hybrid transmission system of FIG. 1 at a first gear of a parallel mode.

As shown in FIG. 7, in this embodiment, at the first gear of parallel mode, the first brake 41 is engaged, and the second planet carrier 72 is fixed. The second motor 13 drives the first sun gear 61, the first sun gear 61 transmits the power to the second gear ring 74 through the first planet gear 63 and the first planet carrier 62, and the second gear ring 74 transmits the power to the second intermediate shaft 35, and then to the differential 50.

Meanwhile, the first clutch 21 is engaged, and the engine 11 transmits the power to the first input shaft 31 through the first clutch 21, and then to the first sun gear 61. The first sun gear 61 transmits the power to the second gear ring 74 through the first planet gear 63 and the first planet carrier 62, and the second gear ring 74 transmits the power to the second intermediate shaft 35 and then to the differential 50.

Figure 8:
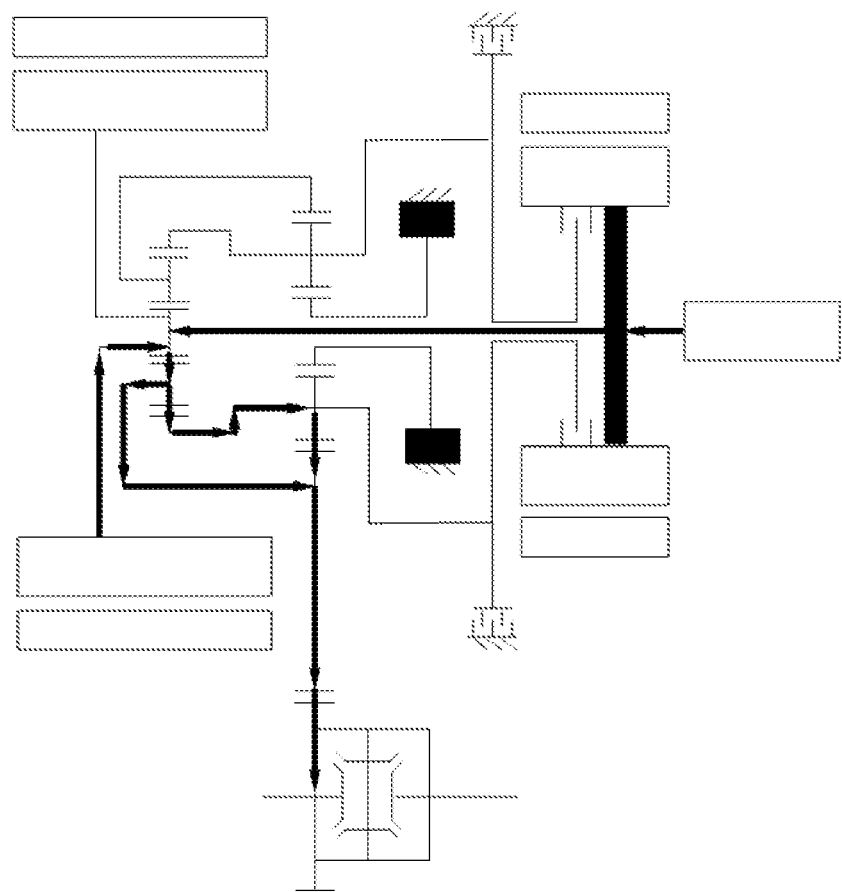
FIG. 8 is a power path diagram of the dual-motor multi-gear hybrid transmission system of FIG. 1 at a second gear of the parallel mode.

As shown in FIG. 8, in this embodiment, at the second gear of parallel mode, the second brake 42 is engaged, and the second sun gear 71 is fixed. The second motor 13 drives the first sun gear 61, the first sun gear 61 transmits a part of the power to the second gear ring 74 through the first planet gear 63 and the first planet carrier 62; the other part of the power is transmitted from the first planet carrier 62 to the first gear ring 64, and then from the first gear ring 64 to the second planet carrier 72 and the second gear ring 74; the second gear ring 74 then transmits the power to the second intermediate shaft 35, and then to the differential 50.

Meanwhile, the first clutch 21 is engaged, and the engine 11 transmits the power to the first input shaft 31 through the first clutch 21, and then to the first sun gear 61. The first sun gear 61 transmits a part of the power to the second gear ring 74 through the first planet gear 63 and the first planet gear carrier 62; the other part of the power is transmitted from the first planet carrier 62 to the first gear ring 64, and then from the first gear ring 64 to the second planet carrier 72 and the second gear ring 74; the second gear ring 74 then transmits the power to the second intermediate shaft 35, and then to the differential 50.

Figure 9:
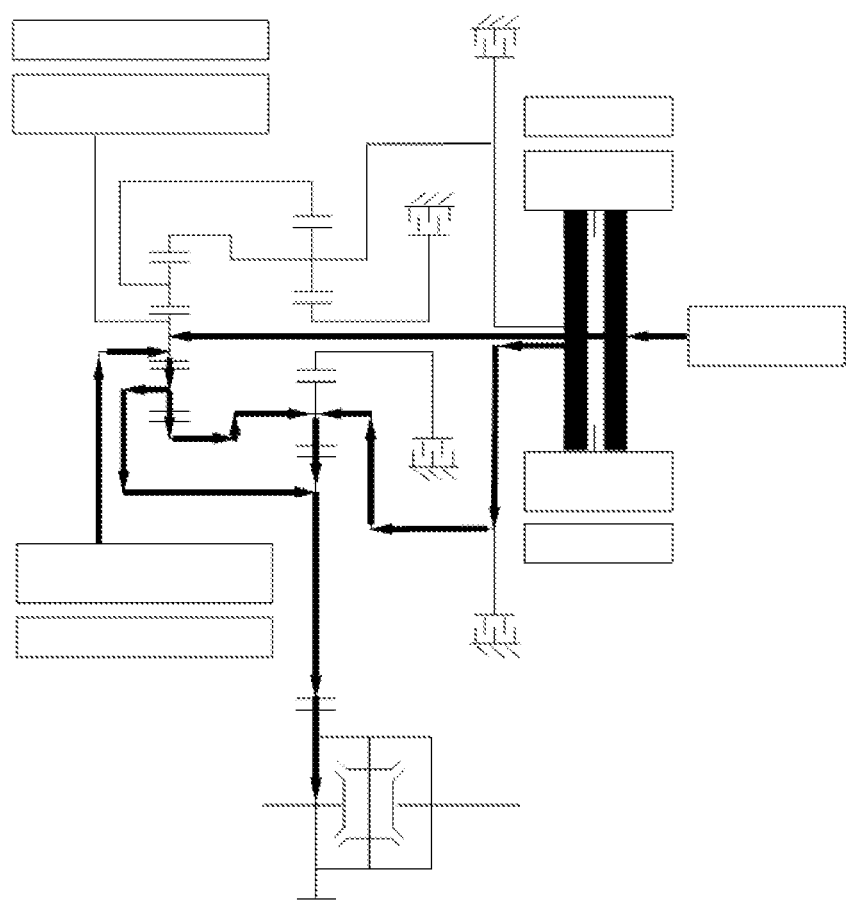
FIG. 9 is a power path diagram of the dual-motor multi-gear hybrid transmission system of FIG. 1 at a third gear of the parallel mode.

As shown in FIG. 9, in this embodiment, at the third gear of parallel mode, the first brake 41 is disengaged and the second brake 42 is disengaged. The second motor 13 drives the first sun gear 61, the first sun gear 61 transmits a part of the power to the second gear ring 74 through the first planet gear 63 and the first planet carrier 62; the other part of the power is transmitted from the first planet carrier 62 to the first gear ring 64, and then from the first gear ring 64 to the second planet carrier 72 and the second gear ring 74; the second gear ring 74 then transmits the power to the second intermediate shaft 35, and then to the differential 50.

Meanwhile, the first clutch 21 is engaged. The engine 11 transmits the power to the first input shaft 31 through the first clutch 21, and then to the first sun gear 61. The first sun gear 61 transmits a part of the power to the second gear ring 74 through the first planet gear 63 and the first planet gear carrier 62; the other part of the power is transmitted from the first planet carrier 62 to the first gear ring 64, and then from the first gear ring 64 to the second planet carrier 72 and the second gear ring 74; the second gear ring 74 then transmits the power to the second intermediate shaft 35, and then to the differential 50;

Meanwhile, the second clutch 22 is engaged, and the engine 11 transmits the power to the second input shaft 32 through the second clutch 22, and then to the second planet carrier 72 and the second gear ring 74. The second gear ring 74 transmits the power to the second intermediate shaft 35, and then to the differential 50.

Figure 10:
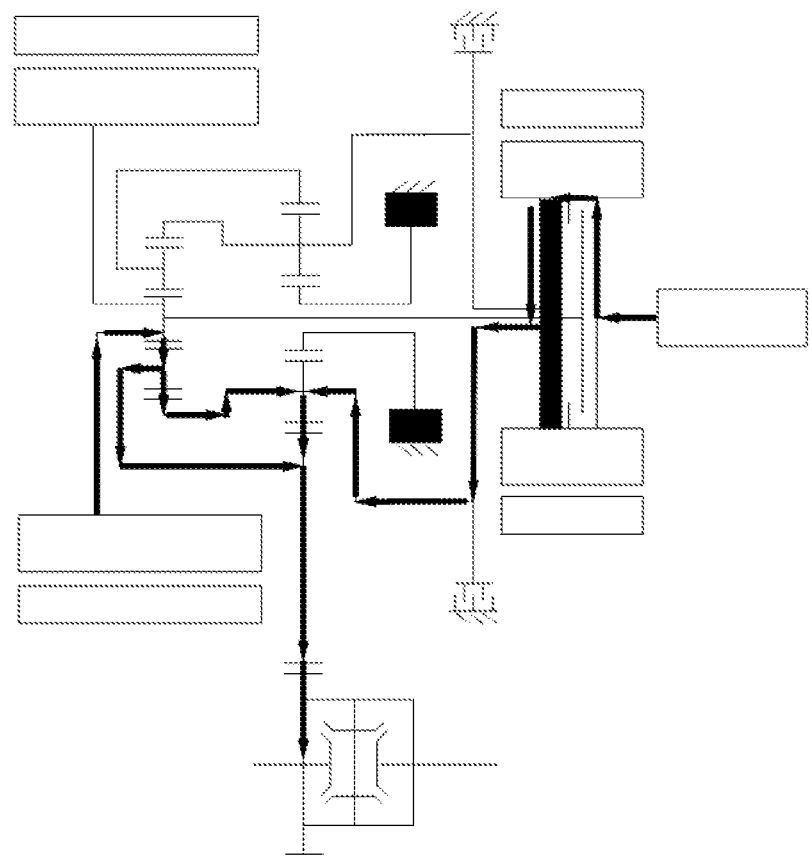
FIG. 10 is a power path diagram of the dual-motor multi-gear hybrid transmission system of FIG. 1 at a fourth gear of the parallel mode.

As shown in FIG. 10, in this embodiment, at the fourth gears of parallel mode, the second brake 42 is engaged, and the second sun gear 71 is fixed. The second motor 13 drives the first sun gear 61, the first sun gear 61 transmits a part of the power to the second gear ring 74 through the first planet gear 63 and the first planet carrier 62; the other part of the power is transmitted from the first planet carrier 62 to the first gear ring 64, and then transmitted from the first gear ring 64 to the second planet carrier 72 and the second gear ring 74; the second gear ring 74 then transmits the power to the second intermediate shaft 35, and then to the differential 50.

Meanwhile, the second clutch 22 is engaged, and a part of the power from the engine 11 is transmitted to the second input shaft 32 through the second clutch 22, and then to the second planet carrier 72 and the second gear ring 74. The second gear ring 74 then transmits the power to the second intermediate shaft 35, and then to the differential 50.

Meanwhile, another part of the power from the engine 11 drives the first motor 12 serving as a generator to generate electricity to charge the power battery.

Figure 11:
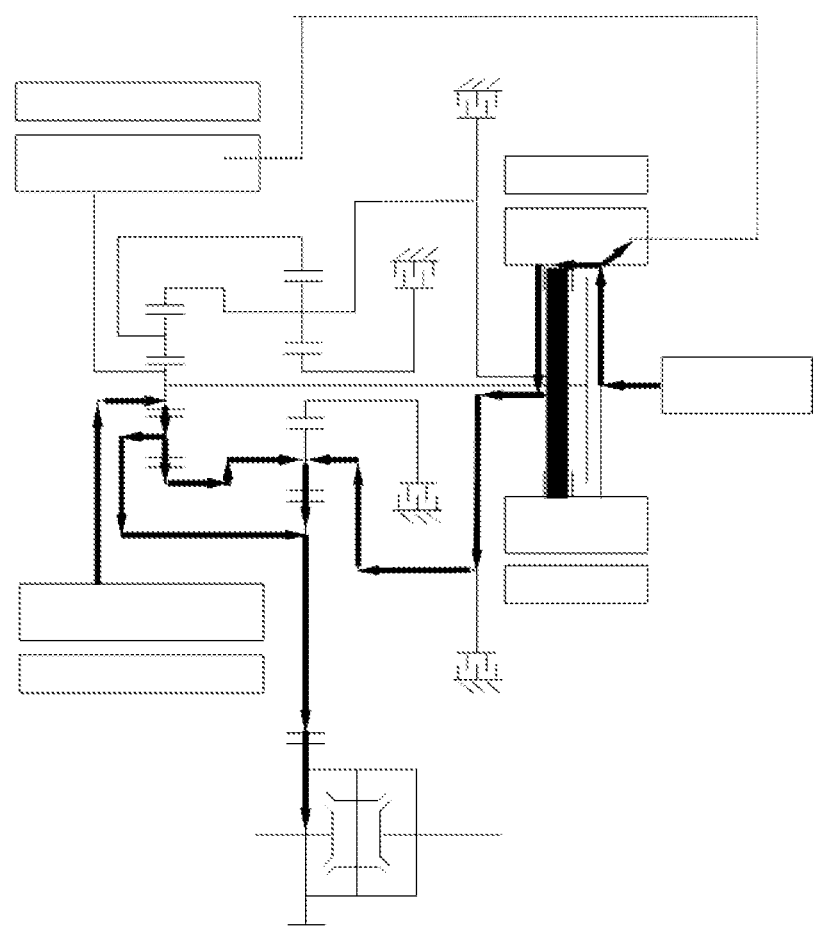
FIG. 11 is a power path diagram of the dual-motor multi-gear hybrid transmission system of FIG. 1 at a power-split mode.

As shown in FIG. 11, in this embodiment, in the power-split mode, the first brake 41 is disengaged, and the second brake 42 is disengaged. The second motor 13 drives the first sun gear 61, the first sun gear 61 transmits a part of the power to the second gear ring 74 through the first planet gear 63 and the first planet carrier 62; the other part of power is transmitted from the first planet carrier 62 to the first gear ring 64, and then from the first gear ring 64 to the second planet carrier 72 and the second gear ring 74; the second gear ring 74 then transmits the power to the second intermediate shaft 35, and then to the differential 50.

Meanwhile, the second clutch 22 is engaged. A part of the power from the engine 11 is transmitted to the second input shaft 32 through the second clutch 22, and then to the second planet carrier 72 and the second gear ring 74. The second gear ring 74 then transmits the power to the second intermediate shaft 35, and then to the differential 50.

Meanwhile, another part of the power from the engine 11 drives the first motor 12 as a generator to generate electricity, and provides the electricity to the second motor 13 for driving by the second motor 13.

Meanwhile, the first motor 12 can also participate in driving as a driving motor.

When each gear is switched, the DCT gear shift mode can be used, or the gear can be shifted through the regulation of the first motor 12 and/or the second motor 13. The operability is extremely high, and the decoupling operation of the gear shift is more convenient.

In each gear of each mode, both the first motor 12 and the second motor 13 can be used for energy recovery. Specifically, both the first motor 12 and the second motor 13 can convert the kinetic energy of the vehicle sliding into electric energy and store the energy in the power battery for use when driving the first motor 12 and/or the second motor 13.

The above nine gears can adapt to a variety of road conditions and meet the needs of different driving conditions. The road conditions that each gear is adapted to are as follows.

The vehicle speed is in the range of 0-40 km/h: when an output torque is small, the first gear of pure electric mode can be adopted; when the state of charge (SOC) is lower than a threshold, the first gear of series mode can be adopted for charging driving; when the output torque is large, the first gear of parallel mode can be adopted.

The vehicle speed is in the range of 40 km/h to 60 km/h: when the output torque is small, the second gear of pure electric mode can be adopted; when the SOC is lower than the threshold, the second gear of series mode can be adopted for charging driving; when the output torque is large, the second gear of parallel mode can be adopted.

The vehicle speed is in the range of 60 km/h to 120 km/h: when the output torque is small, the power-split mode can be adopted; when the output torque is large, the third gear of parallel mode can be adopted.

The vehicle speed is in the range of 120 km/h to 160 km/h: when the output torque is small, the fourth gear of parallel mode can be adopted; when the SOC is lower than the threshold, the power-split mode can be adopted for driving; when the output torque is large, the third gear or the fourth gear of parallel mode can be adopted.

The vehicle speed is in the range of 160 km/h to max km/h: when the output torque is small/large, the power-split mode can be adopted.

Each gear can realize pure electric mode, series mode, parallel mode and power-split mode at appropriate vehicle speeds, realizing the multi-gear full mode of the dual-motor multi-gear hybrid transmission system and meeting the needs of different driving conditions.

Certainly, the adaptive relationship between gears and road conditions is not limited to the above situations. Different gears of modes can be arranged for different road conditions based on fuel consumption and power. There is no restriction on the adaptive relationship between gears and road conditions here.

Figure 2:
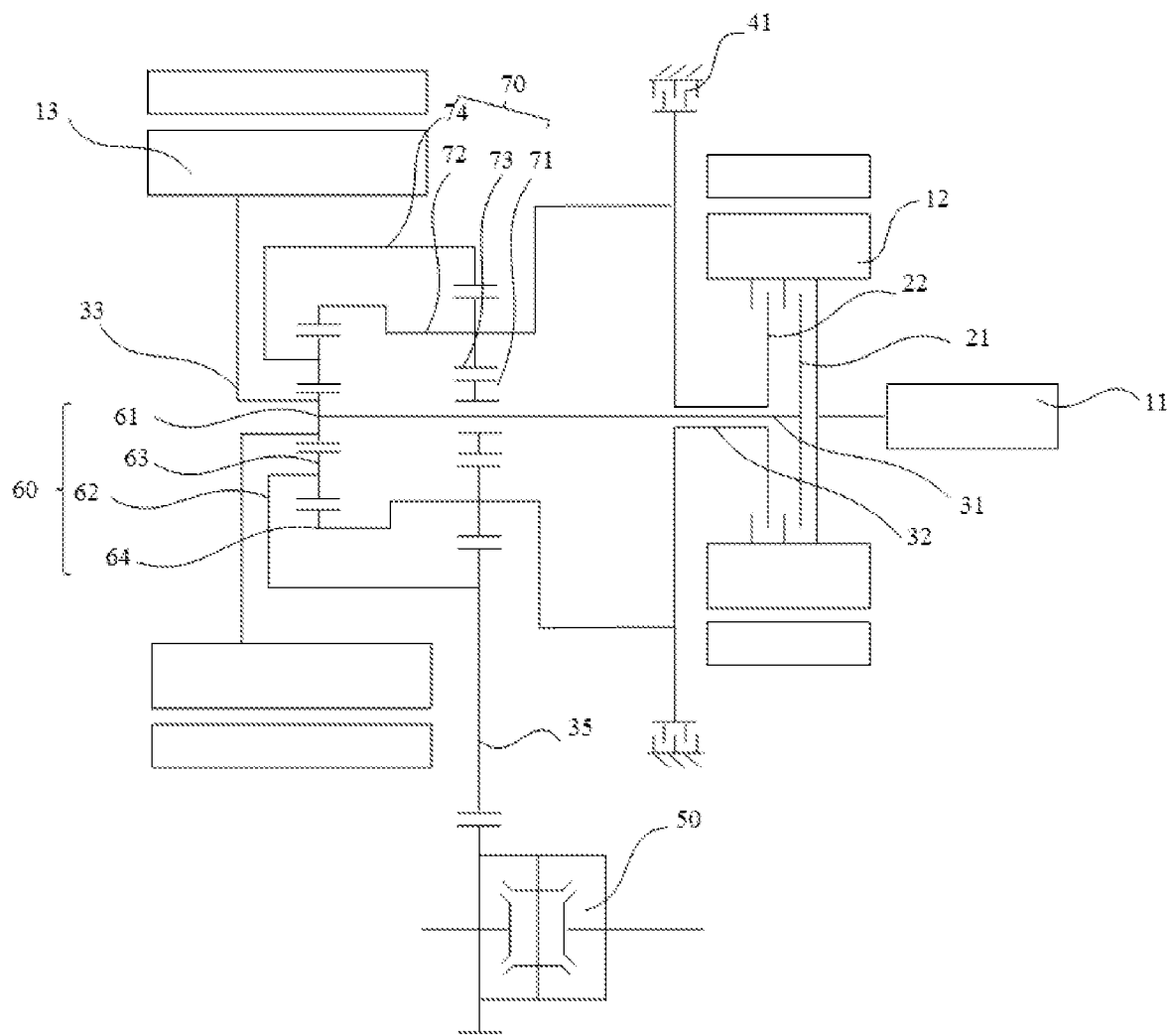
FIG. 2 is a schematic structural view of the dual-motor multi-gear hybrid transmission system according to some other embodiments of the present application.

As shown in FIG. 2, the dual-motor multi-gear hybrid transmission system can realize multi-gear operations in pure electric mode, series mode, parallel mode and power-split mode. In some embodiments, a total of five gears can be realized including first gear of pure electric mode, first gear of series mode, first gear of parallel mode, third gear of parallel mode, and power-split mode.

In the embodiment, the second brake 42 is canceled, and the second sun gear 71 is sleeved outside the first input shaft 31. The second gear of pure electric mode, the second gear of series mode, the second gear and fourth gear of parallel mode are canceled, and the power transmission path of other gears remains unchanged.

Other features in the embodiment are the same, and will not be described again.

The present application also proposes a vehicle (not shown), which includes a dual-motor multi-gear hybrid transmission system. The specific structure of the dual-motor multi-gear hybrid transmission system refers to the above-mentioned embodiments. For adopting all the technical solutions of the above mentioned embodiments, the vehicle has at least all the functions brought by the technical solutions of the above mentioned embodiments, and will not be described again here.

The above are only some embodiments of the present application, and are not intended to limit the scope of the present application. Under the concept of the present application, equivalent structural transformations made according to the description and drawings of the present application, or direct/indirect application in other related technical fields, are included in the scope of the present application.

What is claimed is:

1. A dual-motor multi-gear hybrid transmission system, comprising an engine, a first motor, a second motor, a first clutch, a second clutch, a first planet row, a second planet row, a first input shaft, a second input shaft, a third input shaft and a brake assembly, wherein:

the first input shaft is connected to the engine through the first clutch;

the second input shaft is connected to the engine through the second clutch, and the second input shaft is sleeved outside the first input shaft;

the first motor is connected to the engine;

the second motor is connected to the first planet row through the third input shaft; and the brake assembly is configured to brake the first planet row and/or the second planet row, the first planet row comprises a first sun gear, a first planet carrier, a first planet gear and a first gear ring;

the second planet row comprises a second sun gear, a second planet carrier, a second planet gear and a second gear ring;

the first planet carrier is connected to the second gear ring, and the second planet carrier is connected to the first gear ring;

the brake assembly comprises a second brake connected to the second sun gear;

the dual-motor multi-gear hybrid transmission further comprises a first intermediate shaft sleeved outside the first input shaft; and the second brake is connected to the second sun gear through the first intermediate shaft.

2. The dual-motor multi-gear hybrid transmission system of claim 1, wherein the brake assembly comprises a first brake connected to the second planet carrier.

3. The dual-motor multi-gear hybrid transmission system of claim 1, further comprising a second intermediate shaft connected to the second gear ring and configured to output power.

4. The dual-motor multi-gear hybrid transmission system of claim 3, further comprising a differential connected to the second intermediate shaft.

5. The dual-motor multi-gear hybrid transmission system of claim 1, further comprising a torsional damper provided between the engine and the first motor.

6. The dual-motor multi-gear hybrid transmission system of claim 1, wherein:

both the first motor and the second motor are connected to a power battery, and the dual-motor multi-gear hybrid transmission system has one or more of the following modes:

a pure electric mode, wherein the second motor as a driving motor works by using electric energy of the power battery, the engine does not work, and the first motor does not work;

a series mode, wherein the second motor as the driving motor works by using the electric energy of the power battery, the first motor as a generator is driven by the engine to supply power to the second motor or to charge the power battery under a preset working condition;

a parallel mode, wherein the engine operates at a preset economical operating point, the second motor performs power output according to a current dynamic demand or charges the power battery according to an electric power demand of the power battery, and the first motor does not work; and a power-split mode, wherein the second motor as the driving motor works by using the electric energy of the power battery, the engine works, and the first motor as a generator is driven by the engine to generate electricity for the use of the second motor, or the second motor as the driving motor works by using the electric energy of the power battery, the engine works, and the first motor as the driving motor works by using the electric energy of the power battery.

7. A vehicle, comprising the dual-motor multi-gear hybrid transmission system of claim 1.

* * * * *